United States Patent [19]
Morimoto et al.

[11] Patent Number: 4,775,724

[45] Date of Patent: Oct. 4, 1988

[54] RUBBER COMPOSITIONS WITH GRANULES OF SULFUR, OIL AND METHYLSTYRENE

[75] Inventors: Masaaki Morimoto, Sakado; Seiichiro Iwafune, Hoya, both of Japan

[73] Assignees: Bridgestone Corporation, Tokyo; Shikoku Chemicals Corp., Kagawa, both of Japan

[21] Appl. No.: 37,276

[22] Filed: Apr. 10, 1987

[30] Foreign Application Priority Data

Apr. 18, 1986 [JP] Japan .................................. 61-90886

[51] Int. Cl.$^4$ ............................................ C08C 19/20
[52] U.S. Cl. .................................. 525/333.1; 525/354
[58] Field of Search .............. 528/389; 525/354, 333.1

[56] References Cited

U.S. PATENT DOCUMENTS 2,757,075 7/1956 Haimsohn .......................... 528/389

Primary Examiner—Christopher Henderson
Attorney, Agent, or Firm—Sughrue, Mion, Zinn, Macpeak & Seas

[57] ABSTRACT

A rubber composition contains granules of two-layer structure composed of insoluble sulfur powder treated with α-methylstyrene and a process oil as a vulcanizing agent. In this case, the content of process oil in the inner layer portion of the granule is larger than that in the outer layer portion thereof.

1 Claim, No Drawings

RUBBER COMPOSITIONS WITH GRANULES OF SULFUR, OIL AND METHYLSTYRENE

BACKGROUND OF THE INVENTION

1. Field of the Invention

This invention relates to rubber compositions, and more particularly to a rubber composition using an insoluble sulfur for preventing the blooming of sulfur in the processing of rubber mix.

2. Related Art Statement

In general, the insoluble sulfur can suppress a blooming phenomenon that sulfur migrates toward rubber surface and precipitates thereon pending the completion of vulcanization after the kneading with rubber, so that it is widely used as a vulcanizing agent in the manufacture of radial tires. The conventional insoluble sulfur is powdery, and is usually added with a process oil for uniformly dispersing the insoluble sulfur into rubber during the kneading and for preventing the scattering of fine insoluble sulfur powder in the processing operation. However, since the insoluble sulfur added with the process oil contain a large amount of process oil on its outer surface, the fluidity is poor and it is apt to adhere the process oil to a vessel wall surface of a batcher or the like, so that the processability is considerably poor. For instance, when the insoluble sulfur added with the process oil is charged from the batcher into a Banbury mixer for kneading with rubber, a part of the insoluble sulfur remains in the batcher at a state adhered to the wall surface thereof, and consequently the amount of insoluble sulfur actually charged into the Banbury mixer is changed, resulting in the scattering of properties in the kneaded rubber. Further, the insoluble sulfur is subjected to shearing force and compressive force during the kneading to form agglomerates, which remain in rubber at an insufficient dispersed state and cause the scattering of rubber properties.

In West German Patent laid open No. 1667734, there has been proposed a method of improving the fluidity of sulfur, wherein a mixture of sulfur and petrolatum was molded into a shaped body by means of a roller compression apparatus. In this case, however, the insoluble sulfur is tightly agglomerated by the application of mechanical compression force, and the resulting agglomerates remain in rubber during the kneading without being broken to particle size of the starting sulfur powder. Therefore, this method has still a drawback of causing the scattering of rubber properties. Moreover, Japanese Patent Application Publication No. 57-10,141 proposes a method of improving the fluidity of sulfur, wherein a treating oil having a surface tension reduced by adding a surfactant is added the insoluble sulfur till the starting of granule formation to obtain insoluble sulfur-containing granules. According to the latter method, the resulting granulated insoluble sulfur is good in the fluidity and is not so hard as compared with the aforementioned compression molded body, so that it is easily broken to original particle size during the kneading with rubber to uniformly disperse into rubber. However, the granulated insoluble sulfur is poor in the stability and transforms into common sulfur to cause the blooming phenomenon, and consequently the adhesive force between rubber composition and steel cord lowers.

SUMMARY OF THE INVENTION

It is, therefore, an object of the invention to provide rubber compositions having good stability, fluidity and dispersibility of insoluble sulfur, a good processability and a small scattering of rubber properties without causing the blooming phenomenon and lowering the adhesion property to steel cord.

The inventors have made various studies on causes that the granulated insoluble sulfur disclosed in Japanese Patent Application Publication No. 57-10,141 is considerably poor in the stability and the adhesion property to steel cord though it is excellent in the fluidity and confirmed that the surfactant used results from the above degradation of stability and adhesion property in the insoluble sulfur. Therefore, the inventors have made further examinations with respect to the means for improving the drawbacks of the above insoluble sulfur and found the followings. That is, the stability of insoluble sulfur power is improved by treating the insoluble sulfur powder with α-methylstyrene instead of the surfactant, and also the fluidity is considerably improved by rendering insoluble sulfur powder into granules of a two-layer structure. Moreover, when such granules are kneaded with rubber, they are easily broken to the starting insoluble sulfur powder to thereby uniformly disperse into rubber. And also, the adhesion property to steel cord becomes good.

In this connection, the inventors have made various studies and as a result, the invention has been accomplished.

According to the invention, there is the provision of a rubber composition compounding two-layer granules each composed of insoluble sulfur powder chemically treated with α-methylstyrene and a process oil, wherein a content of the process oil is larger in an inner layer portion of the granule than in an outer layer portion thereof, provided that an amount of insoluble sulfur is 0.5 to 10 parts by weight per 100 parts by weight of rubber component.

The reason why the amount of insoluble sulfur is limited to a range of 0.5-10 parts by weight per 100 parts by weight of rubber component is due to the fact that when the amount is less than 0.5 part by weight, rubber is not sufficiently crosslinked, while when it exceeds 10 parts by weight, the heat aging property of rubber is degraded.

DESCRIPTION OF THE PREFERRED EMBODIMENTS

According to the invention, the insoluble sulfur powder chemically treated with α-methylstyrene is obtained, for example, by dispersing insoluble sulfur powder into an organic solvent containing α-methylstyrene and conducting chemical reaction therebetween with stirring.

The process oil is an oil usually used in rubber compounding, a preferred example of which is an oil consisting essentially of naphthenic or aromatic oil and containing a small amount of paraffinic oil.

In the finally obtained granules, the content of process oil is desirable to be 5–30% by weight based on the total weight of granules. When the content of process oil is less than 5% by weight, the scattering of sulfur becomes undesirably large for sanitary reasons, while when it exceeds 30% by weight, the properties of vulcanized rubber are degraded.

Moreover, the insoluble sulfur granules to be compounded in the rubber composition according to the invention have a two-layer structure composed of an inner layer portion and an outer layer portion. In this case, it is desirable that the inner layer portion contains the process oil of 30–50% by weight per one granule. When the content of process oil in the inner layer portion is less than 30% by weight, the amount of insoluble sulfur powder contained in the outer layer portion of the granule is small and the thickness of the outer layer portion becomes thin to expose the inner layer portion therefrom. While, when it exceeds 50% by weight, the thickness of the outer layer portion becomes too thick and consequently the insoluble sulfur powder scatters from the outer layer portion to degrade the processing environment.

For instance, the insoluble sulfur granules are obtained as follows. That is, the insoluble sulfur powder treated with $\alpha$-methylstyrene is added with process oil in an amount larger than the content of process oil contained in the final granular product and then mixed in a mixing machine till the formation of granules (First mixing step). Thereafter, the insoluble sulfur powder treated with $\alpha$-methylstyrene is further added so as to provide the given content of process oil contained in the final granular body and mixed in the mixing machine to form granules (Second mixing step).

In the thus obtained insoluble sulfur granules, the fluidity is considerably improved because the process oil obstructing the fluidity is hardly or slightly contained in the outer layer portion of the granule. Therefore, the kneading of rubber with these granules and other chemicals can be carried out by the usual batch system. That is, when the insoluble sulfur granules according to the invention are weighed from a batcher and then charged into, for example, a Banbury mixer, all of the weighed granules are supplied without adhering to the wall surface of the batcher, whereby the rubber composition having a constant sulfur content can always be obtained. Further, the granules containing insoluble sulfur according to the invention use the insoluble sulfur treated with $\alpha$-methylstyrene instead of the surfactant, so that the stability of insoluble sulfur in rubber is largely improved, which can prevent the transformation into common sulfur and hence the occurrence of blooming phenomenon. Moreover, since the rubber composition according to the invention does not contain the surfactant, the reduction of adhesive force to steel cord can be prevented, and consequently the rubber composition is particularly suitable to be used as a coating rubber for a belt containing steel cords in a radial tire.

The following examples are given in illustration of the invention and are not intended as limitations thereof.

EXAMPLE 1, COMPARATIVE EXAMPLES 1-3

A rubber composition of Example 1 was produced as follows. At first, insoluble sulfur powders were thoroughly dispersed into carbon disulfide containing 0.2% of $\alpha$-methylstyrene with stirring, filtered, well washed with $\alpha$-methylstyrene containing carbon disulfide and then dried to obtain insoluble sulfur powders containing 50 ppm of $\alpha$-methylstyrene. Then, 12 kg of the above chemically treated insoluble sulfur powders were charged into a high-speed mixing machine together with 5 kg of a process oil and mixed to form an inner layer portion of a granule (first mixing step). Further, 8 kg of the chemically treated insoluble sulfur powders were added and again mixed (second mixing step) to form an outer layer portion on the inner layer portion, whereby there were obtained granules of two-layer structure containing insoluble sulfur, wherein the content of process oil was larger in the inner layer portion (oil content: 41% by weight) than in the outer layer portion (oil content: 0% by weight) and was 20% by weight as a whole. Thereafter, the thus obtained granules were compounded with rubber and other additives as follows. That is, 6 parts by weight of insoluble sulfur in the granules was added with 100 parts by weight of natural rubber, 50 parts by weight of carbon black HAF, 1 part by weight of N-(1,3-dimethylbutyl)-N'-phenyl-p-phenylenediamine, 2 parts by weight of aromatic oil, 8 parts by weight of zinc white, 0.5 part by weight of N-oxydiethylene-2-benzothiazole sulfeneamide and 2 parts by weight of cobalt naphthenate, which were kneaded in a Banbury mixer to obtain a rubber composition.

In Comparative Example 1, a commercially available insoluble sulfur powder containing 20% by weight of a process oil (which contained about 100 ppm of $\alpha$-methylstyrene but no surfactant) was used instead of the chemically treated insoluble sulfur power. In Comparative Example 2, there was used a compression molded body of insoluble sulfur power obtained by passing the insoluble sulfur powder of Comparative Example 1 through two rolls. In Comparative Example 3, a granular insoluble sulfur containing 1.5% by weight of sodium diisopropylnaphthaline sulfonate as a surfactant and 20% by weight of process oil as disclosed in Japanese Patent Application Publication No. 57-10,141 was used instead of the chemically treated insoluble sulfur powder.

Moreover, the granule of Example 1 and the granular insoluble sulfur of Comparative Example 3 had hardnesses causing breakage under loads of 5-20 g and 80-120 g, respectively.

Then, the fluidity of insoluble sulfur, dispersibility and stability of insoluble sulfur in rubber and adhesion property to steel cord were tested by the following evaluation methods to obtain results as shown in the following Table 1.

Test method

Fluidity: After 100 g of insoluble sulfur (sample) was poured into a cylindrical stainless vessel (diameter: 80 mm, height: 50 mm) so as to provide a uniform depth, the sample was fallen down by gravity by quietly and inversely tilting the vessel, and then the amount of insoluble sulfur adhered to the vessel was measured. The smaller the numerical value, the better the fluidity.

Dispersibility: After the kneaded rubber composition was sliced by means of a knife, the sliced surface was observed visually or by a photograph to judge whether or not sulfur agglomerates are existent on the sliced surface.

Stability: The rubber composition was subjected to a warming up through rolls heated at a temperature of 110° C. for 3 minutes to form a sheet, which was left to stand in door at room temperature. Thereafter, the stability of insoluble sulfur was evaluated by observing whether or not sulfur is bloomed on the rubber sheet surface. The stability is good in the case that no blooming is caused.

Adhesion property: After a composite body obtained by embedding brass-plated steel cords ($1 \times 5 \times 0.23$ mm) in the rubber composition was vulcanized at a temperature of 145° C. for 30 minutes, the peeling test between steel cord and rubber was made according to a method of JIS K6301 to measure the amount of rubber adhered to steel cord for the evaluation of adhesion property. In this case, the state of completely adhering rubber to the steel cord was 100 and the state of adhering no rubber to the steel cord was 0. The smaller the numerical value, the poorer the adhesion property.

TABLE 1

|  |  | Example 1 | Comparative Example 1 | Comparative Example 2 | Comparative Example 3 |
|---|---|---|---|---|---|
| Kind of insoluble sulfur | | Granules containing insoluble sulfur | Insoluble sulfur powder | Compression molded body of insoluble sulfur powder | Granular insoluble sulfur |
| Fluidity of insoluble sulfur (g) | | 0.5 | 30 | 0.3 | 0.4 |
| Properties of rubber composition | Dispersibility | good | slightly poor | poor | good |
| | Stability | good | good | good | poor |
| | Adhesion property | 100 | 100 | 85 | 70 |

As seen from the results of Table 1, in the rubber composition of Example 1, the stability and adhesion property were substantially equal to those of Comparative Example 1, while the fluidity and dispersibility were considerably improved together with the good processability, so that the scattering of rubber properties could largely be reduced.

As mentioned above, according to the invention, the stability of insoluble sulfur in rubber and the adhesion property to steel cord are at least equal to those of the conventional rubber composition containing insoluble sulfur powder, but the dispersibility can be considerably improved to largely reduce the scattering of rubber properties. Further, the fluidity of insoluble sulfur in the weighing can considerably be improved to remarkably improve the processability.

What is claimed is:

1. A rubber composition comprising in admixture: (A) two-layer granules and (B) a rubber component, wherein each of the granules is composed of insoluble sulfur powder chemically treated with α-methylstyrene and a process oil, wherein the content of the process oil is 5 to 30% by weight based on the total weight of the granules and wherein the content of the process oil is greater in an inner layer portion of the granules than in an outer layer portion thereof, wherein said inner layer portion of the granules has a content of the process oil of 30 to 50% by weight per one granule and wherein the amount of insoluble sulfur in the rubber composition is 0.5 to 10 parts by weight per 100 parts by weight of the rubber component.

* * * * *